Feb. 10, 1959 L. DERICK ET AL 2,873,222

VAPOR-SOLID DIFFUSION OF SEMICONDUCTIVE MATERIAL

Filed Nov. 7, 1957

INVENTORS L. DERICK
C. J. FROSCH
BY
George S. Indig
ATTORNEY

United States Patent Office 2,873,222

Patented Feb. 10, 1959

2,873,222

VAPOR-SOLID DIFFUSION OF SEMICONDUCTIVE MATERIAL

Lincoln Derick, Colonia, and Carl J. Frosch, Summit, N. J., assignors to Bell Telephone Laboratories, Incorporated, New York, N. Y., a corporation of New York Application November 7, 1957, Serial No. 695,110

13 Claims. (Cl. 148—1.5)

Figure 1:
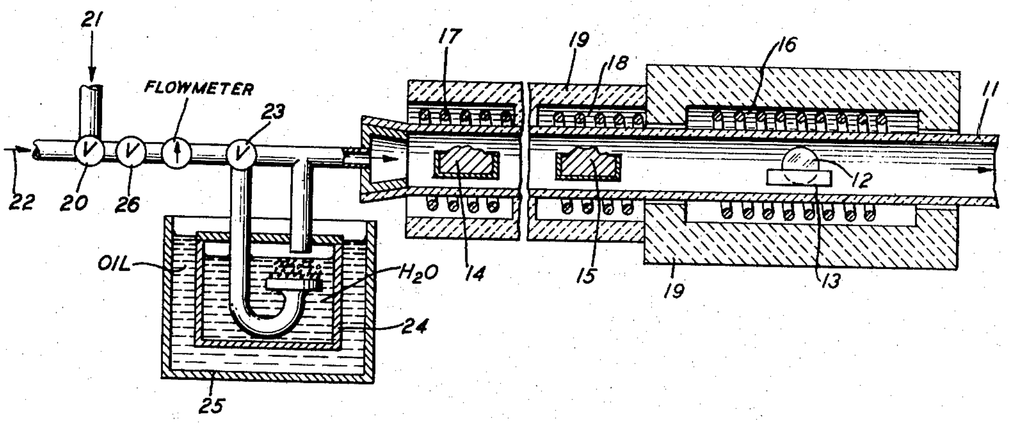

This invention relates to vapor-solid diffusion processes for introducing conductivity-type determining impurities into semiconductive bodies and to bodies so produced. This invention is especially suited to the formation of one or more p-n junctions in a semiconductive body for use in device applications.

Variation of the resistivity and thickness of the base and emitter layers of a junction transistor is a means of controlling the electrical characteristics. The determinative effects of these parameters on the characteristics of such transistors is set forth in great detail in copending applications Serial No. 496,202, filed March 23, 1955, and Serial No. 516,674, filed June 20, 1955. Because it is amenable to a high degree of control, the process of vapor-solid diffusion has been found to be an effective means of forming the base and emitter layers in such transistors.

A vapor-solid diffusion process is one in which conductivity-type determining impurities are introduced into a solid semiconductive body from the vapor state. Vapor-solid diffusion processes may be distinguished from alloying processes in that the latter are dependent on the melting of an impurity and the semiconductive material. One type of vapor-solid diffusion process used in the prior art for the formation of two contiguous layers of opposite conductivity type in a semiconductive body consists of heating the body and one donor and one acceptor impurity source in an evacuated chamber for a prescribed period of time. A process of this type is described in copending application Serial No. 516,674 noted above. In this prior art process the concentrations of the two impurities in the semiconductive material are chiefly dependent upon the temperature of the process. In such a process the impurities are chosen so that one has a higher solubility than the other in the semiconductive material at the temperature of the process and therefore predominates in the surface layer and determines the conductivity type of this layer. Furthermore, it is essential in such a process that the impurity with the lower solubility have a substantially higher diffusivity in the semiconductive material than the other. By virtue of this difference in diffusivities the faster diffusing impurity predominates in the underlying layer and thereby determines the conductivity type of this layer. Such a process is inflexible in that the relative thicknesses of the two diffused layers and the relative concentrations of the impurities in the layers are essentially dependent upon the inherent differences in the diffusivity and solubility of the two impurities used at the temperature of the process.

A second prior art process improves control of layer dimensions and impurity concentrations using two separate heating steps. This process consists of a first step in one furnace in which the slower diffusing impurity is introduced to form the surface layer using suitable time and temperature to control the depth of and concentration of impurity in the layer, and a second step in a second furnace in which the faster diffusing impurity is introduced. Thus, the respective thicknesses and impurity concentrations of the two layers are independently controlled.

The present invention makes possible the formation of two contiguous layers of opposite conductivity and of prescribed physical properties in a one heating step vapor-solid diffusion process. Processes in accordance with the present invention are highly flexible in that the thickness and resistivity of the two layers can be independently controlled. Important advantages of a one heating step process over a two heating step process are its simplicity and ease of operation. The one heating step diffusion processes of the present invention are especially advantageous in the fabrication of silicon bodies for use as transistors since thermal cycling, which may have a deleterious effect on the minority carrier lifetime of silicon, is minimized.

It has been discovered that by proper choice of the composition of the atmosphere in contact with certain acceptor impurity sources, the volatilities of these sources can either be promoted or suppressed. It has also been determined that the volatilities of certain donor impurity sources are unaffected by the changes in composition of the atmosphere which cause the volatility changes in the acceptor sources. Thus, by proper choice of the composition of the atmosphere in contact with both these donor and acceptor impurity sources, the semiconductive body can be contacted first with an atmosphere containing the donor and then with an atmosphere containing both the donor and the acceptor. In this manner results at least comparable to those obtained by use of the two heating step process of the prior art are attained in one heating step. By proper regulation of the concentration of the donors and acceptors in the atmospheres, and by choice of a donor and acceptor whose diffusivities have a suitable relationship, two distinct contiguous layers of opposite conductivity are formed.

For example, it has been discovered that by treating the trioxide of certain acceptor elements of group III of the periodic table with an atmosphere including a reducing gas, such as hydrogen, at an elevated temperature, the acceptor is volatilized and introduced into the atmosphere. The trioxides of these acceptor elements of group III are essentially non-volatile when heated in contact with a non-reducing atmosphere.

It has also been discovered that, in the instance where hydrogen is used as the reducing gas, the inclusion of water vapor in the atmosphere has a retarding effect on the volatilization of the acceptor impurity source. It has been determined that the partial pressure of the acceptor impurity can be effectively controlled by regulating the amount of water vapor in the atmosphere. Such control affords a means of directly controlling the concentration of acceptor impurity in the semiconductive material since such concentration is directly proportional to the vapor pressure of the impurity in the atmosphere in contact with the material. It is hypothesized that the acceptor trioxide is rendered volatile by reason of its reduction to a suboxide form. Thus, the retarding action of the water vapor may be attributable to the fact that it is a reaction product, the addition of which tends to shift the equilibrium of the reaction. It has been determined that where carbon monoxide is used as the reducing gas, carbon dioxide has the same retarding effect on the volatilization of the acceptor trioxide source.

It has further been determined that the use of any non-reducing gas innocuous to the semiconductive material, for example nitrogen, in combination with the reducing gas also has a retarding effect on the volatilization of the acceptor source, and is another effective means of controlling the partial pressure of the acceptor trioxide source. However, the retardation in this instance is attributable to the dilution effect of the nonreducing gas.

There is thus made possible by the practice of the present invention the formation of a single diffused layer whose depth and resistivity can be accurately controlled. Furthermore, this high degree of control is also present in those processes of this invention in which two or more diffused layers of opposite conductivity type are produced.

Where the diffusion processes of this invention involve the use of silicon as the semiconductive material, a small quantity of water vapor is desirably included in the reducing atmosphere to eliminate pitting and surface deterioration of the surface of the silicon. Either water vapor or oxygen may serve this purpose in the non-reducing atmosphere. See United States Patent 2,802,760 issued August 13, 1957.

The term acceptor is used herein to describe a substance which imparts p-type conductivity when incorporated in a semiconductive material, and the term donor is used to describe a substance which imparts n-type conductivity. The term significant impurity is used generically to denote a substance, either donor or acceptor, which affects the conductivity type of a semiconductive material. The resistivity of a semiconductive material is proportional to the excess of one type of significant impurity over the other in a semiconductive material. "Donor impurity source" denotes the substance used in this invention as the source of the donor, and the terminology "acceptor impurity source" is used in an analogous manner. An atmosphere which promotes the volatility of acceptor impurity sources is termed a "volatility-promoting atmosphere," and one which suppresses the volatility of these sources is termed a "volatility-suppressing atmosphere."

Figure 2:
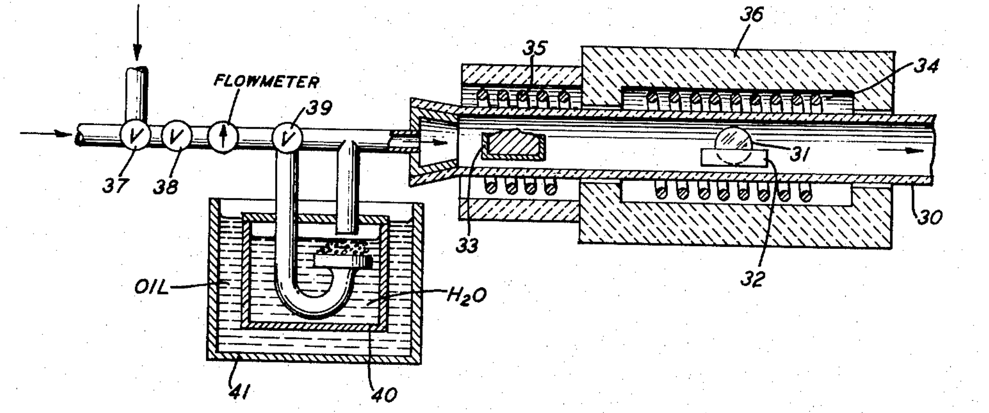

The present invention will be better understood from the following more detailed description, taken in conjunction with the accompanying drawings, in which:

Fig. 1 is a schematic view of an apparatus for forming two or more diffused layers of opposite conductivity type in a semiconductive body in accordance with the principles of the present invention; and Fig. 2 is a schematic view of an apparatus suitable for forming one diffused layer in a semiconductive body in accordance with the principles of the present invention.

With further reference now to the drawings, Fig. 1 depicts an apparatus which is suitable for forming two contiguous layers of opposite conductivity-type in a semiconductive body, for example, the base and emitter layers in a body to be used in a transistor device. Fig. 1 shows an elongated fused silica furnace tube 11 containing the semiconductive body 12 which is held in receptacle 13. At the left of body 12 in tube 11 are the donor impurity source 14 and acceptor impurity source 15. Heating coils 16, 17, and 18 are used to maintain the body 12, the donor source 14, and the acceptor source 15, respectively, at the proper temperature levels. By using these independently controlled coils and by proper spacing of source 14, source 15, and body 12, there is afforded independent temperature control for these three sections. The furnace tube 11 is insulated with asbestos 19 or other suitable insulating material.

The particular gas which is used to form the atmosphere in contact with the sources is selected by means of valve 20, shown as a two-way valve for simplicity. With this arrangement a volatility-promoting atmosphere 21 or volatility-suppressing atmosphere 22, is obtained merely by turning valve 20. The flow rate of the gas is controlled by valve 26 in conjunction with the flowmeter. Valve 23, also a two-way valve, permits the gas selected either to enter tube 11 directly or to be bubbled through the water bath in a receptacle 24. The gas leaves the water bath essentially saturated with water vapor, and thus the water vapor content of the atmosphere is controlled by proper selection of the water bath temperature. The water bath temperature is controlled by immersing the receptacle 24 in a temperature controlled oil bath 25. Saturation of the gas in the water bath is assured by using a fritted tube to reduce the bubble size.

As the gas passes over the impurity sources 14 and 15 it picks up any vapors evolved and carries them into contact with body 12. Where a volatility-suppressing atmosphere 22 is used, only the donor is present in the atmosphere and therefore only the donor is introduced into the semiconductive body. When a volatility-promoting atmosphere 21 is used, both donor and acceptor are introduced into the body simultaneously. In the apparatus used the gas is exhausted directly to the atmosphere after leaving tube 11.

In accordance with an example herein utilizing the apparatus of Fig. 1, a body of n-type silicon of 5 ohm-centimeters resistively is used as the semiconductive body 12, gallium trioxide ($Ga_2O_3$) as the acceptor impurity source 15 and arsenic trioxide ($As_2O_3$) as the donor impurity source 14. As a general rule, group III acceptor impurities have higher diffusivities in silicon than group V donor impurities, and in this instance gallium in fact has a higher diffusivity than arsenic. It is therefore expedient to first form an n-type surface layer utilizing the arsenic, and then to vaporize the gallium trioxide. The faster diffusing gallium will then diffuse through the n-type layer to form a p-type layer.

Since the vapor pressure of the acceptor in the atmosphere is amenable to a high degree of control in processes of the present invention, there exists a means of insuring that the n-type surface layer formed in the fist step is not overdoped in the second step. It has been determined that where silicon is the semiconductive material and gallium trioxide and arsenic trioxide are the sources used, if the silicon temperature is in the range of 900° C. to 1400° C., and the arsenic trioxide temperature is in the range of 200° C. to 250° C., there is no overdoping of the arsenic-rich surface layer by the gallium regardless of the composition of atmospheres which are used. This is by reason of the fact that at these temperatures, the arsenic in the silicon reaches the solubility limit. Since the solubility limit of arsenic in silicon, in the temperature range noted, is approximately an order of magnitude greater than the solubility limit of gallium, overdoping does not occur. If the temperature of the arsenic trioxide source is reduced below 200° C., or if use is made of a donor source whose solubility in the silicon is low relative to that of gallium, the partial pressure of the gallium in the atmosphere is controlled in accordance with the principles of this invention to prevent overdoping of the n-type surface layer.

To form two distinct layers in body 12, nitrogen, a volatility-suppressing gas, is selected by means of valve 20. The nitrogen is preferably bubbled through the water bath for reasons discussed above. The mixture of nitrogen and water vapor then passes over the impurity sources and carries vapors containing arsenic into contact with body 12. The arsenic diffuses into body 12 thereby forming an n-type layer. After a predetermined period of time hydrogen is substituted for the nitrogen by turning valve 20. With hydrogen, a volatility-promoting gas, in the atmosphere in contact with the impurity sources, both arsenic and gallium are present in the vapor state and contact the body 12. The faster diffusing gallium diffuses through the arsenic doped n-type layer to form an underlying p-type layer. When the desired depths of the layers are attained, the diffusion process is ended.

Experimental data relating to these materials and atmospheres are listed in Table I. In the series of diffusions represented by this data the arsenic trioxide was maintained at 220° C. and the gallium trioxide at 900° C. The nitrogen and hydrogen were introduced at a flow rate of 1500 cubic centimeters per minute through the water bath which was maintained at 30° C. The diameter of furnace tube 11 was approximately one inch.

TABLE I

| Temp. of Silicon Body (° C.) | Time of Diffusion (minutes) | | Layer Thickness (mils) | |
|---|---|---|---|---|
| | $N_2$ | $H_2$ | n-layer | p-layer |
| 1,150 | 60 | 40 | 0.05 | 0.06 |
| 1,150 | 120 | 240 | 0.08 | 0.13 |
| 1,150 | 960 | 420 | 0.18 | 0.19 |
| 1,200 | 180 | 60 | 0.13 | 0.06 |
| 1,200 | 120 | 120 | 0.14 | 0.18 |
| 1,250 | 30 | 30 | 0.11 | 0.14 |
| 1,300 | 10 | 20 | 0.12 | 0.17 |
| 1,350 | 5 | 10 | 0.13 | 0.24 |
| 1,350 | 9 | 6 | 0.16 | 0.13 |

The relative depths of the n-type and p-type layers vary widely according to the conditions under which they were formed. Since the p-type layer is under the n-type it should be appreciated that gallium diffusion depth in each instance is equal to the sum of the n-type layer thickness and the p-type layer thickness. A good example of the depth control possible is evidenced by a comparison of the two diffusions performed at 1200° C. Although the total heating time is the same, 240 minutes, in one instance the time during which hydrogen was used was 60 minutes, and in the other was 120 minutes. The gallium diffusion depth produced by the 60-minute diffusion was 0.19 mils as compared to a depth of 0.32 mils produced by a diffusion time in hydrogen of 120 minutes.

In a process in accordance with the present invention for forming two diffused layers in which the volatility-suppressing and the volatility-promoting atmospheres include water vapor, for instance, the formation of a thin oxide layer due to the presence of the water vapor occurs simultaneously with the diffusion of the conductivity-type determining impurities. As described in copending application Serial No. 550,622, such an oxide layer on a silicon body tends to inhibit the introduction of certain donor impurities of group V. However, it has been determined that this masking effect does not significantly interfere with the introduction of these donor impurities in processes in accordance with this invention.

Since the group V donors suitable for use in this invention may be masked by a comparatively thick oxide film, there is made possible the formation of an n-p-n-p structure in accordance with this invention of utilizing a wafer with one broad preoxidized surface. To this end, a wafer of n-type conductivity is heated in an oxygen atmosphere at a temperature and for a time to produce a masking oxide layer over the surface (see United States Patent 2,802,760 issued August 13, 1957). The oxide layer is then removed from one broad face by use of hydrofluoric acid, for instance. The resultant wafer with a masking oxide layer on one broad face is then treated as described in the above embodiment. On the unoxidized face an n-type surface layer and an underlying p-type layer are formed, whereas in the oxidized face of the water there is formed a p-type layer only, since the oxide effectively blocks the introduction of the group V donor impurity. By utilizing masking techniques the oxide layer may be formed in a prescribed configuration, and n-p-n-p structures suitable for switching devices can be fabricated.

Fig. 2 shows an apparatus which is suitable for diffusing a controlled amount of a group III acceptor impurity into a semiconductive body. Depicted is a fused silica furnace tube 30 which contains semiconductive body 31 held in receptacle 32. To the left of body 31 is the acceptor source 33 held in a fused silica container for convenience. Heating coils 34 and 35 are used to maintain the body 31 and source 33, respectively, at the proper temperature levels. The tube 30 is insulated using asbestos 36 or other insulation material.

The valving arrangement is similar to that of the apparatus shown in Fig. 1. The gas which forms the atmosphere is selected by valve 37, and the flow rate of the gas is controlled by means of valve 38 in conjunction with the flowmeter. The gas is either bubbled through water or introduced directly into the furnace tube 30 depending upon the position of valve 39. The water bath in receptacle 40 is maintained at the desired temperature by means of temperature controlled oil bath 41.

Formation of a diffused layer in accordance with this aspect of the present invention utilizing the apparatus in Fig. 2 is conveniently accomplished by following one of two general procedures or a combination thereof. The first procedure involves the use of a volatility-promoting atmosphere of one composition throughout the process. The composition of the atmosphere is chosen to provide the desired concentration of acceptor in the body 12. The temperature of the body 31 and the time of the diffusion are then chosen to produce the desired depth of the diffused layer.

The second general procedure involves predeposition. This procedure comprises use of a volatility-promoting atmosphere for a first period of time. By judicious choice of the composition of the atmosphere and the time of exposure the number of acceptor atoms introduced into body 31 is effectively controlled. At the end of the prescribed time a volatility-suppressing atmosphere is substituted for the volatility-promoting atmosphere. This substitution effectively eliminates further introduction of the acceptor into the semiconductive body 31 by suppressing the volatilization of the acceptor source thus eliminating it from the atmosphere in contact with body 31. Merely removing the acceptor source from the furnace tube does not preclude introduction of acceptors into body 31 since traces of the acceptor which have deposited on the walls of the tube can revaporize. However, by use of a volatility-suppressing atmosphere the acceptor which has deposited on the walls of the tube as well as the acceptor source is prevented from volatilizing thereby effectively precluding further introduction of acceptors into body 31. The body 31 is then maintained at an elevated temperature for a second period of time calculated to produce the desired depth of the diffused layer.

It should be mentioned that the concentration gradients of the acceptor in the diffused layers produced by the above two procedures differ. If the surface of the semiconductive body is continually in contact with an atmosphere containing a fixed concentration of significant impurity during the diffusion, the gradient obtained is a complementary error function type. In the second method noted above where the semiconductive body is contacted for a limited time with an atmosphere containing the impurity source and then heated out of contact with such vapor to allow the pre-deposited significant impurity to diffuse, the gradient obtained approaches a Gaussian function.

The effect of variation in water content of the atmosphere on the concentration of acceptor impurity in the diffused layer is noted in Table II. The carrier gas is essentially saturated at the temperature of the water bath noted in the first column. The data of Table II were obtained utilizing an apparatus similar to that shown in Fig. 2. Hydrogen at a flow rate of 1500 cubic centimeters per minute was used in the volatility-promoting atmosphere and the diameter of the furnace tube was approximately one inch. The semiconductive body was n-type monocrystalline silicon initially of 5 ohm-centimeter resistivity which had been pre-oxidized by heating at 1300° C. in oxygen for one hour. The acceptor source was gallium trioxide. The temperature of the silicon body was 1350° C., the temperature of the gallium trioxide was 950° C., and the time of the process in each instance was one hour.

TABLE II

| Water Temperature (° C.) | Layer Thickness | Sheet Resistivity, Ohms/square | Concentration at Surface, Atoms/cubic centimeter |
|---|---|---|---|
| 30 | 0.89 | 112 | $9.5\times10^{17}$ |
| 40 | 0.84 | 200 | $2.7\times10^{17}$ |
| 50 | 0.75 | 393 | $1.2\times10^{17}$ |
| 55 | 0.67 | 679 | $7.1\times10^{16}$ |
| 60 | 0.59 | 972 | $5.8\times10^{16}$ |

The figures in Table II emphasize the degree of control possible by the practice of the present invention. Merely by changing the temperature of the water through which the gas was bubbled, the amount of significant impurity introduced into the semiconductive body was varied over a broad range.

The concentration of an acceptor in a semiconductive body is amenable to control by controlling the partial pressure of the reducing gas in the atmosphere in contact with the acceptor impurity source. Any non-reducing gas which is innocuous with respect to the impurity sources and to the semiconductive body and which will not react with the reducing gas is suitable as a diluent. Gases such as nitrogen and the members of the rare gas family of group VIII of the periodic table are examples of gases suitable for this purpose. Preferably, such diluent is used in combination with water vapor, or oxygen to avoid the pitting adverted to above.

Table III is illustrative of the second procedure disclosed above for forming a diffused layer by using two different atmospheres. In the series from which the data of Table III were obtained, the silicon body, pre-oxidized as described above, was maintained at 1350° C. and the gallium trioxide was maintained at 950° C. Hydrogen was used as the reducing gas in the volatility-promoting atmosphere and nitrogen was used as the main constituent of the volatility-suppressing atmosphere. Both the hydrogen and nitrogen were bubbled through water at 30° C. at a rate of 1500 cubic centimeters per minute. The furnace tube used had a diameter of approximately one inch.

TABLE III

| Sequence of Gases (minutes) | | | Layer Thickness, p-layer (mils) | Sheet Resistivity of p-layer, Ohms/square |
|---|---|---|---|---|
| $H_2$ | $N_2$ | $H_2$ | | |
| 10 | 50 | 0 | 0.85 | 566 |
| 20 | 40 | 0 | 0.92 | 221 |
| 30 | 30 | 0 | 0.95 | 192 |
| 60 | 0 | 0 | 0.92 | 112 |
| 5 | 50 | 5 | 0.78 | 270 |

The possibilities of this type of manipulation of atmospheres can be appreciated by comparison of the first and last sets of data listed in Table III. Although the total time during which the hydrogen atmosphere was used was the same in both instances, the sheet resistivity in the last one is half that of the first, the diffusion depths being approximately the same. This is because the acceptor impurity which had deposited on the silicon during the first ten minutes in the first process diffused into the semiconductive body during the following fifty minutes thereby reducing the surface concentration. However, in the last instance the concentration of significant impurity was at a high level in the surface of the resultant body since the atmosphere in contact with the body during the last five minutes included the significant impurity. A process of this latter type is advantageous in that the formation of an ohmic contact to a high resistivity body is made possible.

It has been determined that carbon monoxide is suitable as a reducing gas for producing a volatility-promoting atmosphere in accordance with this invention. Likewise, carbon dioxide is suitable for use as a retarding agent. It is to be understood that other reducing gases which react with the group III trioxides of this process to form volatile sub-oxides, and which are innocuous in other respects, are suitable either singly or in combination in the practice of this invention.

With respect to the volatility-suppressing atmosphere as defined above, any gas which is not reducing with respect to the group III acceptor trioxides and which is innocuous with respect to the impurity sources and semiconductive materials used is suitable. In addition to nitrogen, carbon dioxide, and the members of the rare gas family, oxygen is also suitable. The inclusion of oxygen or water vapor in the volatility-suppressing atmosphere is preferred since both oxygen and water vapor are known to eliminate pitting and surface deterioration in silicon.

In an illustrative example described above gallium trioxide was used as the acceptor impurity source, arsenic trioxide as the donor source, and silicon as the semiconductive material. It is to be recognized that this invention can be practiced using other donor sources, for example antimony oxide ($Sb_2O_4$) in place of the arsenic trioxide. It has been determined that in processes wherein the silicon temperature is in the range of 900° C. to 1400° C., and the acceptor source is gallium trioxide no overdoping of the n-type surface layer by the gallium occurs provided the antimony oxide is maintained at a temperature in the range of 600° C. to 950° C. If the antimony oxide is maintained at temperatures lower than 600° C., the partial pressure of the gallium in the atmosphere in contact with the body being doped is reduced in accordance with the principles of this invention to prevent overdoping of the n-type surface layer. Moreover, other group III acceptor sources such as indium trioxide ($In_2O_3$) are suitable for use either singly or in combination with a donor impurity source. Any donor and acceptor sources which meet the requirements set forth herein may be used to produce two diffused layers in a semiconductive body. Consideration of the relative diffusivities and solubilities of the two sources with respect to the semiconductive material to be doped dictates the composition of the atmosphere, the temperature of the body and the sources, and the times of exposure necessary to produce the desired results.

It is to be understood that inasmuch as this invention relates to a method for including or excluding certain group III conductivity-type determining impurities in an atmosphere suitable for use in vapor-solid diffusion processes, the principles of this invention are applicable to the processing of semiconductive materials such as germanium, alloys of germanium and silicon, and other extrinsic semiconductors whose electrical properties are affected by the inclusion of these significant impurities.

Several examples illustrating in detail the principles of the present invention are set forth below. It is to be understood that the examples described are merely representative, and that the number of specific processes which can be developed based on this invention are limitless. Therefore, any process including the use of a group III significant impurity source wherein the concentration of the impurity in a semiconductive body is effectively controlled by utilizing a volatility-promoting atmosphere as defined herein, either preceding, following or in conjunction with a volatility-suppressing atmosphere as defined herein is within the spirit and scope of this invention.

*Example 1*

A p-type layer was formed on an n-type silicon body as follows:

A slice was cut from a monocrystalline ingot of silicon of n-type and of resistivity of approximately 5 ohm-centimeters. The slice was lapped, cut and etched to produce wafers about 30 mils thick, and about 0.3 inch square. The wafer was pre-oxidized by treating in oxygen at 1300° C. for one hour. A wafer so prepared was positioned in a fused silica tube approximately one inch in diameter which was part of an apparatus of the kind illustrated in Fig. 2, and heated to approximately 1350° C. A mass of gallium trioxide was positioned in the apparatus and heated to approximately 950° C. Hydrogen which was catalytically purified was introduced into the water bath at a rate of 1500 cubic centimeters per minute. The water bath consisted of deionized water maintained at 30° C.

The wafer was treated for a period of ten minutes under these conditions. At the end of this period nitrogen was substituted for the hydrogen and the wafer treated for a period of fifty minutes.

The resultant wafer had a p-type layer on both broad faces of a depth approximately .85 mil and a resistivity of approximately 566 ohms/square. The data shown in Table III were obtained in processes similar to the one described in this example.

*Example 2*

Two contiguous layers of opposite conductivity type were formed on a silicon body as follows:

A silicon wafer of the type described in Example 1, with the exception that it was not pre-oxidized, was positioned in an apparatus of the kind shown in Fig. 1 and was heated to a temperature of 1200° C. A mass of arsenic trioxide ($As_2O_3$) was positioned in the apparatus and maintained at a temperature of 200° C., and a mass of gallium trioxide was positioned and maintained at a temperature of 900° C. Nitrogen at the rate of 1500 cubic centimeters per minute was introduced into the water bubbler which was maintained at 30° C.

The wafer was treated under these conditions for 180 minutes at which time hydrogen was substituted for the nitrogen. The wafer was treated in contact with the hydrogen atmosphere for a period of sixty minutes.

The resultant wafer had formed on each of the broad faces a surface layer of n-type conductivity of approximately .13 mil thickness and a contiguous underlying layer of p-type conductivity of approximately .06 mil thickness. The n-type layer had a sheet resistivity of 51 ohms/square.

The data shown in Table I were obtained in processes similar to the one described in the above example.

*Example 3*

Two contiguous layers of opposite conductivity type were formed on a silicon body as follows:

The same general procedure was used as in Example 2 except that antimony oxide ($Sb_2O_4$) which was maintained at 950° C. was substituted for the arsenic trioxide and the gallium trioxide was also maintained at 950° C.

The wafer was exposed to the nitrogen atmosphere for a period of 120 minutes. Hydrogen was then substituted for the nitrogen, and the wafer treated for a further period of 120 minutes.

The resultant wafer had formed on each of the broad faces a surface layer of n-type conductivity of approximately .06 mil thickness and a contiguous underlying layer of p-type conductivity of approximately .26 mil thickness. The surface n-type layer had a sheet resistivity of 850 ohms/square.

The following two examples are illustrations of materials other than those used in Examples 1 through 3 which are also suitable for the practice of this invention. Example 4 relates to the use of carbon monoxide as a reducing gas and Example 5 relates to the use of indium trioxide as an acceptor impurity source in processes in accordance with the principles of the present invention.

*Example 4*

A p-type layer was formed on an n-type silicon body as follows:

A wafer prepared as described in Example 1, but not pre-oxidized, was placed in a furnace tube approximately one inch in diameter similar to that shown in Fig. 2. The wafer was heated to 1200° C. Gallium trioxide was used as the acceptor impurity source and was maintained at a temperature of 950° C. Carbon monoxide at a rate of 1500 cubic centimeters per minute was bubbled through a water bath maintained at 0° C. and then passed into the furnace tube. The silicon wafer was treated for a period of 60 minutes under these conditions.

The resultant wafer had a p-type layer on the opposite broad faces of a depth of approximately .20 mil. The sheet resistivity of these p-type layers was approximately 1110 ohms/square.

*Example 5*

A p-type layer was formed on an n-type silicon body as follows:

A wafer prepared as described in Example 1, but not pre-oxidized, was placed in a furnace tube approximately one inch in diameter similar to that shown in Fig. 2. The wafer was maintained at 1300° C. Indium trioxide ($In_2O_3$) was used as the acceptor impurity source and was maintained at 1300° C. Hydrogen was bubbled through a water bath maintained at 30° C. at a flow rate of 1500 cubic centimeters per minute. The wafer was treated under these conditions for a period of 30 minutes.

The resultant wafer had a p-type layer on the opposite broad faces of a depth of approximately 0.18 mil. The sheet resistivity of these p-type layers was approximately 3400 ohms/square.

What is claimed is:

1. A process comprising the steps of successively contacting a first atmosphere comprising at least one gas selected from the group consisting of $H_2$ and CO to a trioxide selected from the group consisting of $Ga_2O_3$ and $In_2O_3$, which trioxide is maintained at an elevated temperature, and then to an extrinsic crystalline semiconductive body maintained at an elevated temperature, and following said first atmosphere with a second atmosphere comprising a non-reducing gas.

2. A process in accordance with claim 1 wherein said semiconductive body is silicon.

3. A process in accordance with claim 1 wherein said trioxide is $Ga_2O_3$.

4. A process in accordance with claim 1 wherein said trioxide is $In_2O_3$.

5. A process in accordance with claim 1 wherein said first atmosphere consists essentially of hydrogen and water vapor and said second atmosphere consists essentially of nitrogen and water vapor.

6. A process in accordance with claim 5 wherein said trioxide is $Ga_2O_3$.

7. A process in accordance with claim 5 wherein the water vapor content in said first atmosphere is in the range of from zero to that amount corresponding to saturation of the hydrogen at a temperature of 70° C. and wherein the water content of said second atmosphere is in the range of from zero to that amount corresponding to saturation of the nitrogen at a temperature of 70° C.

8. A process in accordance with claim 1 wherein said second atmosphere is followed by a third atmosphere comprising at least one gas selected from the group consisting of hydrogen and carbon monoxide.

9. A process comprising the steps of successively contacting a first atmosphere comprising a non-reducing gas to a pair of significant impurity sources consisting of a trioxide selected from the group consisting of $Ga_2O_3$ and $In_2O_3$ and a donor, wherein said trioxide is maintained at an elevated temperature and said donor impurity source is maintained at an elevated temperature, and then to an extrinsic crystalline semiconductive body maintained at an elevated temperature, and following said first atmosphere with a second atmosphere comprising at least one gas selected from the group consisting of $H_2$ and CO.

10. A process in accordance with claim 9 wherein said semiconductive body is silicon.

11. A process in accordance with claim 9 wherein said trioxide is $Ga_2O_3$.

12. A process in accordance with claim 11 wherein said donor impurity source is $As_2O_3$.

13. A process in accordance with claim 11 wherein said donor impurity source is $Sb_2O_4$.

No references cited.